United States Patent
Maziarz

(10) Patent No.: US 10,307,860 B2
(45) Date of Patent: Jun. 4, 2019

(54) METHOD OF MANUFACTURING A MULTI-ALLOY AEROSPACE COMPONENT

(71) Applicant: AIRBUS OPERATIONS LIMITED, Bristol (GB)

(72) Inventor: Robert Maziarz, Bristol (GB)

(73) Assignee: Airbus Operations Limited, Bristol (GB)

( * ) Notice: Subject to any disclaimer, the term of this patent is extended or adjusted under 35 U.S.C. 154(b) by 46 days.

(21) Appl. No.: 15/645,730

(22) Filed: Jul. 10, 2017

(65) Prior Publication Data

US 2018/0021880 A1    Jan. 25, 2018

(30) Foreign Application Priority Data

Jul. 19, 2016  (GB) .................................. 1612531.2

(51) Int. Cl.
| | | |
|---|---|---|
| *B23K 20/12* | (2006.01) | |
| *B23K 20/233* | (2006.01) | |

(Continued)

(52) U.S. Cl.
CPC .......... *B23K 20/122* (2013.01); *B23K 20/129* (2013.01); *B23K 20/2336* (2013.01);
(Continued)

(58) Field of Classification Search
CPC .............. B23K 20/2336; B23K 20/129; B23K 2103/18; B23K 2103/10; B23K 2101/006;
(Continued)

(56) References Cited

U.S. PATENT DOCUMENTS

| 3,436,515 A | 4/1969 | Sayer et al. |
| 2001/0052561 A1 | 12/2001 | Wollaston et al. |

(Continued)

FOREIGN PATENT DOCUMENTS

| EP | 1547717 A1 | 6/2005 |
| EP | 1547720 A1 | 6/2005 |

(Continued)

OTHER PUBLICATIONS

GB Communication in GB Appln. No. 1612531.2, dated Feb. 7, 2017.
European Search Report for European Application No. 17180676.3 dated Dec. 8, 2017; 6pp.

*Primary Examiner* — Kiley S Stoner
(74) *Attorney, Agent, or Firm* — Jenkins, Wilson, Taylor & Hunt, P.A.

(57) ABSTRACT

A method of making an aerospace component such as a spar for an aircraft wing is disclosed. The method includes placing two billets of different alloy in abutting relation, there being no voids or channels formed therebetween, partial penetration friction stir welding together the two billets from opposing sides of the billets, the welds so formed being separated by a central region formed partly by one billet and partly by the other billet, and then machining away material. The machining may be performed so as to leave no portion having a partial penetration friction stir weld, so as to remove all of the central region, and so as to form a multi-alloy spar having at least one transverse web section having a slot formed at least in part by the removal of the central region.

17 Claims, 4 Drawing Sheets

(51) Int. Cl.
  *B64C 3/18*    (2006.01)
  *B64F 5/00*    (2017.01)
  *B23K 101/00*  (2006.01)
  *B23K 103/10*  (2006.01)
  *B23K 103/18*  (2006.01)

(52) U.S. Cl.
  CPC .............. *B64C 3/185* (2013.01); *B64F 5/00*
     (2013.01); *B23K 2101/006* (2018.08); *B23K*
     *2103/10* (2018.08); *B23K 2103/18* (2018.08)

(58) Field of Classification Search
  CPC ........ B23K 20/122–20/128; B64F 5/00; B64C
     3/185
  USPC ................................ 228/112.1, 2.1, 159–163
  See application file for complete search history.

(56) References Cited

U.S. PATENT DOCUMENTS

| | | | | |
|---|---|---|---|---|
| 2003/0010805 | A1* | 1/2003 | Nelson | B23K 20/126 |
| | | | | 228/2.1 |
| 2004/0065040 | A1* | 4/2004 | Aota | B23K 20/122 |
| | | | | 52/582.1 |
| 2004/0144832 | A1 | 7/2004 | Nakamura et al. | |
| 2006/0013645 | A1 | 1/2006 | Ilyushenko et al. | |
| 2006/0039792 | A1 | 2/2006 | Ferte et al. | |
| 2008/0308610 | A1* | 12/2008 | Watson | B23K 20/122 |
| | | | | 228/112.1 |
| 2009/0072007 | A1* | 3/2009 | Nagano | B23K 20/1255 |
| | | | | 228/112.1 |
| 2009/0101755 | A1* | 4/2009 | Brice | B64C 3/28 |
| | | | | 244/117 A |
| 2009/0294018 | A1* | 12/2009 | Gross | B23K 20/126 |
| | | | | 156/73.5 |
| 2011/0073634 | A1* | 3/2011 | Packer | B23K 20/123 |
| | | | | 228/2.3 |
| 2011/0211965 | A1 | 9/2011 | Deal et al. | |
| 2014/0248510 | A1* | 9/2014 | Sayama | B32B 15/012 |
| | | | | 428/653 |
| 2015/0064013 | A1* | 3/2015 | Measom | B29C 70/342 |
| | | | | 416/226 |
| 2015/0209892 | A1 | 7/2015 | Furfari et al. | |
| 2015/0226068 | A1 | 8/2015 | Maurizio | |
| 2017/0157720 | A1* | 6/2017 | Sato | B23K 20/12 |
| 2017/0182587 | A1* | 6/2017 | Tokoro | B23K 20/123 |
| 2018/0245566 | A1* | 8/2018 | Sawada | F03D 80/30 |

FOREIGN PATENT DOCUMENTS

| | | | |
|---|---|---|---|
| EP | 1556184 A2 | 7/2005 | |
| EP | 2362066 A2 | 8/2011 | |
| EP | 2474382 A1 | 7/2012 | |
| EP | 2727681 A1 | 5/2014 | |
| JP | H10225780 A | 8/1998 | |
| JP | 2013124098 A * | 6/2013 | ............. B64C 3/185 |

* cited by examiner

METHOD OF MANUFACTURING A MULTI-ALLOY AEROSPACE COMPONENT

RELATED APPLICATIONS

The present application claims priority from Great Britain Application No. 1612531.2, filed Jul. 19, 2016, the disclosure of which is hereby incorporated by reference herein in its entirety.

BACKGROUND OF THE INVENTION

The present disclosure concerns a method of manufacturing a multi-alloy aerospace component. More particularly, but not exclusively, this invention concerns a method of making an aircraft spar from two metal billets of different alloy. The invention also concerns an aerospace component so made and other related products.

Embodiments of this invention relate to a method of welding together two metal workpieces to form a bi-alloy aerospace component. In this context, an aerospace component means one that forms part of a fixed-wing aircraft, a helicopter, a missile, a satellite, a space structure or the like. The invention relates particularly, but not exclusively, to a method of welding together two large metal components to form a part or a whole of a bi-alloy spar for a wing of an aircraft and to a spar so created. It will also be appreciated that the method may be extended to make an aerospace component made from more than two different metal alloys and/or to join more than two metal workpieces and such variations are considered to be within the scope of the present invention.

In many applications it is necessary to weld together two large metal components. In many applications, it is also useful if the two components have different properties, thereby creating a structure having certain properties in one section and different properties in another section. For example, a spar in the wing of an aircraft is subject to forces in its upper section different from those in its lower section and it is therefore advantageous if the two sections are constructed from metals having different properties.

Large aircraft wings are assembled from many components by joining them together with fasteners (examples of which are bolts and rivets). Each wing typically has two main spars, a forward spar and a rear spar, both running the length of the wing. Some large wings also have a centre spar. Each spar has a length, measured in a direction from the joint of the wing and the fuselage to the wing tip, and a height, measured in a direction from the upper surface to the lower surface of the wing (typically being a maximum of the order of 1 to 2 meters in a large transport aircraft, but decreasing steadily along the length of the wing to the wing tip). The spar is relatively narrow along most of its height but the upper and lower portions are of a greater width (typically no more than 200 mm) so that the overall cross-sectional shape of the spar is usually substantially that of a 'C', although other shapes such as an 'I' are possible. The spar is strengthened at regular intervals along its length by stiffeners which are substantially the same height as the spar but have a width greater than the width of the spar away from its top and bottom portions. The stiffeners take the form of plates located transverse to the spar length. The spar may also include integrated rib-posts for facilitating the attachment of ribs that typically extend from one spar to another, in a direction transverse to the length of the spars.

A spar can be constructed from many individual components which are riveted and bolted together (known as a fabricated spar) or from one piece (from plate material, an extrusion or a forged billet) which is then machined (known as an integrally-machined spar). Fabricated spars can be formed from metal components having different properties, which are bolted together. However, fabricated spars are labour-intensive to assemble, requiring the drilling of many holes and the setting of rivets and bolts. They are also expensive because the assembly process requires sophisticated tooling, and they are heavier because of the material overlap and the rivets and bolts. They are also at greater risk of fatigue damage due to the large number of fastener holes. The advantages of integrally-machined spars are that there is no need for material overlap in the region of a join between different parts of the spar, bolts and rivets are not required (thereby reducing the overall weight) and sophisticated tooling is not needed for assembly. However, such spars are difficult to manufacture if they are to be machined from a single block of material, having differing properties in different regions.

It has been proposed (for example, see EP 1 547 720) to machine a spar from two metal components, the metals having different properties, which have been friction stir welded together. Friction stir welding is a particularly suitable method for welding together metals having different and even dissimilar properties, but has its limitations, particularly as regards the depth of welding that can be achieved, and particularly in relation to alloys developed for high-strength aerospace applications, such as 2000 series and 7000 series alloys. Currently the maximum depth of material which can be reliably welded by friction stir welding of such alloys is about 35 mm. The methods proposed in EP 1 547 720 require a channel to be machined in the two workpieces that are to be joined together so that the amount of contact measured across the width of the surfaces of the workpieces to be welded is less than the width of each component. By reducing the contact width of the surfaces it becomes feasible to friction stir weld together two workpieces with full penetration welds. A slot or channel may however be present in the finished component, which may require strengthening by means of a strap plate attached with rivets in the region of the slot or channel and/or may be prone to problems associated with increasing local stresses where a machined stiffener and/or rib post changes from a deep section to a shallow section then back to a deep section. The friction stir welding tool needed to perform the method of manufacture of EP'720 is in the form of a bobbin tool having a pair of shoulders arranged to abut opposite sides of the full-penetration joint to be welded, with a friction stir welding pin extending between the shoulders. The channel formed in the metal components must therefore be large enough to accommodate the far shoulder of the bobbin and must be of constant cross-section along its entire length. Friction stir welding with the bobbin tool must be performed along the whole length of the components, as it is not generally possible to withdraw the bobbin tool out from the welding site midway through the welding process.

The present invention seeks to mitigate one or more of the above-mentioned problems. Alternatively or additionally, the present invention seeks to provide an improved or alternative method of making a multi-alloy aerospace component.

SUMMARY OF THE INVENTION

The present invention provides, according to a first aspect, a method of manufacturing a multi-alloy aerospace component, wherein the method comprises the following steps:

arranging a first metal workpiece against a second metal workpiece, the first metal workpiece being of a first metal alloy and the second metal workpiece being of a second metal alloy, the second metal alloy being different from the first metal alloy, friction stir welding in a first direction from a first side of the first and second workpieces to form a first weld that extends partially into the workpieces to a first depth and joins partially the first and second workpieces, friction stir welding in a second direction from a second side of the first and second workpieces to form a second weld that extends partially into the workpieces to a second depth and joins partially the first and second workpieces, the second side being on the opposite side of the workpieces to the first side, the deepest extent of the first weld being separated from the deepest extent of the second weld by a central region of material that extends all the way between the deepest extent of the first weld and the deepest extent of the second weld, the central region of material including both material of the first metal workpiece and material of the second metal workpiece, and machining away material from the workpieces, the machining including machining away material from the central region of material to form a void being open at opposite ends in a direction parallel to the first direction and to convert the first weld and the second weld either side of the void into full penetration welds.

According to a second aspect of the invention there is also provided a method of making a spar including placing two billets of different alloy in abutting relation, there being no voids or channels formed therebetween, partial penetration friction stir welding together the two billets from opposing sides of the billets, the welds so formed being separated by a central region formed partly by one billet and partly by the other billet, one billet comprising a first alloy and the second billet comprising a second alloy, and machining away material so as to leave no portion having a partial penetration friction stir weld, to remove all of the central region, and to form a multi-alloy spar having at least one transverse web section having a slot formed at least in part by the removal of the central region, the slot being positioned midway between the far ends of the full-penetration friction stir welds that extend to either side of the slot.

According to a third aspect there is provided an aircraft wing or tail plane including a multi-alloy aerospace component according to the present invention as described or claimed herein. The invention also provides, according to a fourth aspect, a multi-alloy aerospace component according to the present invention as described or claimed herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
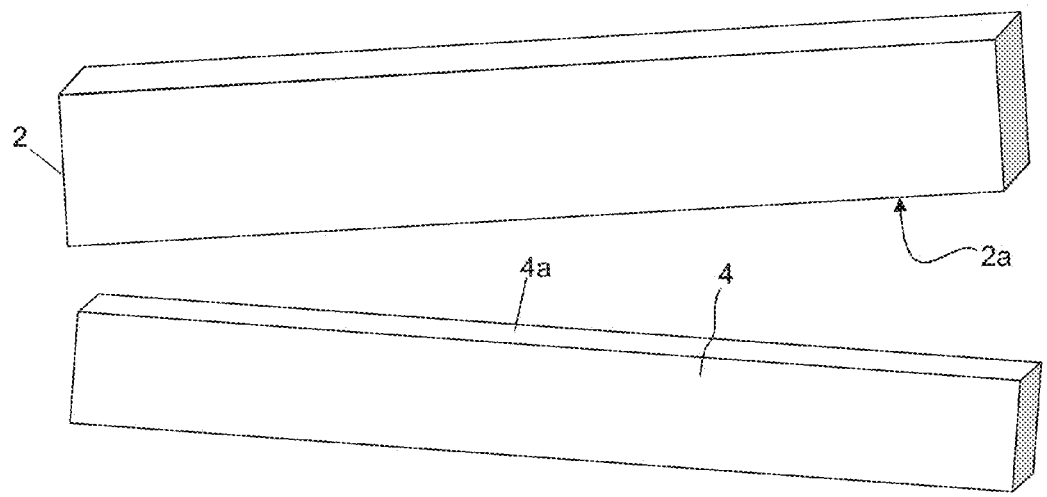
FIG. 1 is a perspective view of two billets of differing alloys used in a method according to a first embodiment of the invention.

Certain embodiments of the present invention relate to a method of manufacturing a multi-alloy aerospace component. Such a method may comprise a step of arranging a first metal workpiece against a second workpiece, then friction stir welding in a first direction from a first side of the first and second workpieces to form a first partial penetration weld and then friction stir welding in a second direction from a second side of the first and second workpieces to form a second partial penetration weld. The first metal workpiece is made from a first metal alloy and the second metal workpiece is made from a second, different, metal alloy. For example the composition of the first metal alloy may be different from the composition of the second metal alloy.

The second direction is typically parallel to the first direction and the second side is typically on the opposite side of the workpieces to the first side. The first and second welds may be directly opposite each other. The first and second welds, both being in the form of partial penetration welds, only extend partially into the workpieces. The first direction may be generally aligned with the length of the workpiece. The second direction may be generally aligned with the length of the workpiece.

The first and second welds only partially join the first and second workpieces together, there being a central region of material comprising opposing surfaces of the first metal workpiece and the second workpiece which are not welded together. After the first and second welds have been completed, the deepest extent of the first weld is thus separated from the deepest extent of the second weld by the central region of material. The central region of material extends substantially all the way between the deepest extent of the first weld and the deepest extent of the second weld and includes both material of the first metal workpiece and material of the second metal workpiece.

The method includes a step of then (i.e. after the first and second welds have been made) machining away material from the workpieces to form the multi-alloy aerospace component. The step of machining includes machining away material from the central region of material to form a void being open at opposing ends (for example at ends separated in a direction parallel to the direction of the welds). The step of machining also includes machining away material to convert the first weld and the second weld either side of the void into full penetration welds. The step of machining away material from the central region, after the partial penetration welds have been formed has several potential advantages in embodiments of the invention. The bulk of material in the region of the friction stir welding, particular the central region of material, may help with efficient heat transfer during the welding process and/or physically supporting the workpieces in the region to be welded. Machining away material after the friction stir weld has been performed, to convert the partial penetration weld into a full penetration weld may alleviate residual stresses in the material arising from the welding process in an efficient manner. It may also be possible to weld in a manner that causes less distortion in the work-pieces, which can lead to tighter tolerances in the dimensions of the workpieces pre-welding and possibly therefore lower volumes of waste material. Also the method does not suffer from the constraints of having to use a bobbin tool when friction stir welding. Instead there may be used a friction stir welding tool having a shoulder and a pin extending from the shoulder, the pin terminating at a free-end which in use is fully submerged in the material being welded. Not needing to use a bobbin tool allows greater flexibility. The void can be a different shape/size and/or be smaller, than permitted when using a bobbin tool. It may be that the friction stir welding tool of the method can be withdrawn and re-submerged at different portions along the length of the workpieces.

The first and second workpieces may have a shape (before the step of welding them together) such that the abutting surfaces of the workpieces are directly adjacent to each other at all points within the overlapping footprints of the workpieces. The abutting surfaces may be parallel and touching (or very near to touching) at all points within the overlap. It may be that the abutting surfaces have a complementary shape such that there is substantially no overhang and such that there are no areas of either surface that are not directly adjacent to (e.g. in contact) the corresponding surface of the other workpiece. It may be that each workpiece has a length, a width, and a height, the surface to be placed in abutting relation with a corresponding surface of the other workpiece extending the entire length and width of the workpiece. The abutting surfaces may both be substantially planar.

The workpieces may be in the form of plates. The workpieces may be in the form of billets. The workpieces may be in the form of extrusions. The workpieces may be partially machined or shaped in advance of the welding steps in view of the final desired shape of the component.

The first and second welds may extend along the entire length of the overlapping footprints of the workpieces. One or both of the first and second welds may be partial penetration welds along their entire length.

As mentioned above, there is a step of machining away material from the central region of material disposed between the ends (the roots) of the welds to form a void in the welded together workpieces. After the first and second welds have been formed and before that machining step has been performed, there may be an air gap between the two workpieces in the region not friction stir welded, but such an air gap is preferably small, and more preferably negligible. For a given cross-section (perpendicular to the length of the workpieces) of the void that is machined, the void will have an area, and the size of the air-gap if present may be small compared to that area (of the void). For example, it may that for any given cross-section (perpendicular to the length of the workpieces) any air gap that exists before the machining step occupies an area of less than 5%, and preferably less than 1%, of the area of the void that is then machined. The region that becomes the void may have a volume of which more than 95% is filled with either the first metal alloy or the second metal alloy. It may be that the region that becomes the void has a volume of which more than 99% is filled with either the first metal alloy or the second metal alloy.

The step of machining away material may include machining away more than half, possibly more than two thirds, and in some cases more than 75%, of the combined mass of the first and second workpieces. When machining away material from the welded together workpieces, there may be some cross-sections where the majority of material is machined away, possibly more than 75% of the material. In certain embodiments more than 90% of material may be machined away.

In the case where the aerospace component includes stiffeners along its length, there may be cross-sections (which form the stiffeners) where both the first and second welds, or parts thereof, remain intact and there may be there may be other cross-sections (at positions in between the stiffeners) where all of one of the first and second welds and surrounding material in the local proximity are removed. There may be a portion of the multi-alloy aerospace component so formed by the machining step, which extends between two locations being separated in a direction parallel to the first direction (e.g. along the length of the component), where the first and second workpieces are welded together only by means of the first weld. In such a case the second weld may have been machined away or may have never been formed.

The void may be in the form of a slot. The void may be formed in a part of the multi-alloy aerospace component that forms a transverse web section, for example of or forming a stiffener. The step of machining away material from the workpieces may include using a milling tool. The milling tool may be oriented in one or more directions to mill away material to form the transverse web section (the tool for example being transverse to the normal axis of the plane of the transverse web section for at least some of the milling). The milling tool may be oriented in one or more different directions (for example being generally along or parallel to the normal axis of the plane of the transverse web section for at least some of the milling) when milling away material to form the void in the transverse web section. Thus, there may be a step of using the milling tool oriented in a given direction to mill away material to form the transverse web section and then subsequently using a milling tool (possibly the same milling tool) in a different, transverse, direction, to mill away material to form the void in the transverse web section.

The void may be positioned midway between opposite sides of the multi-alloy aerospace component (the sides corresponding to the opposite sides from which the friction stir welding is performed). The void is preferably positioned so that it is substantially centred on the neutral axis such that distortion/residual stresses in the component are substantially symmetrically disposed to either side of the centre of the void. The position and/or shape of the void may allow for greater flexibility of the positions of one or more fixing points for a rib, or other component, that is to be fixed to the structure immediately surrounding the void (such surrounding structure for example being a web of a stiffener). There may be six or more such fixing points. Each such fixing point may be arranged at a different height. It may be that at least two such fixing points are arranged at different positions along the width of the component. For the fixing points above the void, each adjacent pair of fixing points (along the height of the component) may be at different widths. For the fixing points below the void, each adjacent pair of fixing points (along the height of the component) may be at different widths. The fixing points may be in the form of holes, for example for receiving a bolt or similar fixing.

The multi-alloy aerospace component produced by the method may be suitable for use in assembly, for example to form part of an aircraft, either with or without further modification. For example, there may need to be a further treatment step before it is used in assembly. Alternatively, the aerospace component may, after the machining step, be substantially ready for assembly, no further modification being required. The multi-alloy aerospace component may be a component that forms the load bearing part of a primary structure. The multi-alloy aerospace component so formed may be a spar, for example for an aircraft. The aerospace component so formed may be a bi-alloy aircraft wing spar. The component may be longer than 5 m. The component may be longer than 10 m. The void may be in the form of a slot formed in a transverse web section of a spar, the transverse web section forming at least part of a stiffener, for example a rib post. The rib post may have multiple holes formed in it for receiving one or more bolts for attaching a wing rib to the rib post of the spar.

Certain embodiments of the present invention relate to a method of making a spar. The method may include a step of placing two billets of different alloy in abutting relation, there being no voids or channels formed therebetween, and then partial penetration friction stir welding together the two billets from opposing sides of the billets, the welds so formed being separated by a central region formed partly by one billet and partly by the other billet. There may be a step of machining away material, preferably conducted after the step of friction stir welding together the two billets. The step of machining away material may be so performed as to leave no portion having a partial penetration friction stir weld. For example, a partial penetration friction stir weld may, by means of the machining away of material, be converted into a full penetration friction stir weld. The step of machining away material may be so performed as to remove all of the central region. The step of machining away material may be so performed as to form a multi-alloy spar having at least one transverse web section having a slot formed at least in part by the removal of the central region. The slot may be positioned midway between the far ends of the full-penetration friction stir welds that extend to either side of the slot.

One of the first and second metal alloys may be a 2xxx series Aluminium alloy. One of the first and second metal alloys may be a 7xxx series Aluminium alloy.

The multi-alloy aerospace component produced by the method may be used as part of an assembly that forms part or the whole of an aircraft. For example, the aerospace component may form part of an aircraft wing, an aircraft tail-plane, or an aircraft.

There now follows a description of specific embodiments, including the embodiments illustrated by FIGS. 1 to 7. A first embodiment concerns the manufacture of a bi-alloy aircraft spar 10 (see FIG. 5). FIG. 1 shows, in accordance with a first embodiment, two workpieces to be joined, in the form of a first upper billet 2 being made from Advanced 7000 series aluminium alloy and a second lower billet 4 formed from Advanced 2000 series aluminium alloy. The opposing surfaces, that is the underside 2a of the first upper billet and the uppermost side 4a of the second lower billet are shaped so as to fit together without any substantial gap therebetween.

Figure 2:
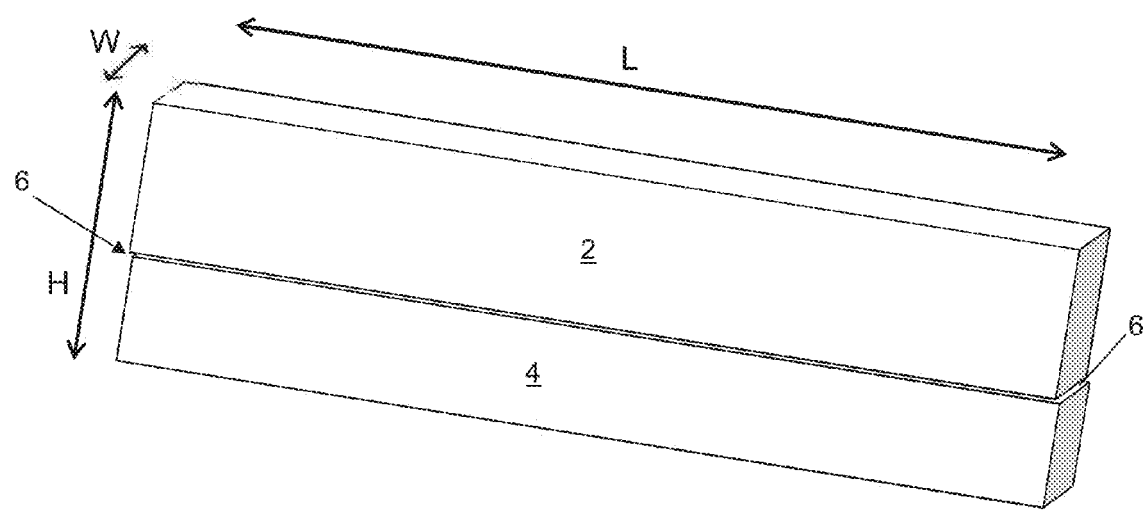
FIG. 2 a perspective view of the two billets of FIG. 1 placed against each other in a position ready for welding.

The billets are placed directly adjacent to each other so that opposing surfaces abut, as shown in FIG. 2. The opposing surfaces thus abut over substantially the entire region of overlap therebetween—i.e. with no voids being formed (it will be appreciated that there may be some areas where there are gaps between the billets as a result of the deviation of the opposing surfaces from a perfectly flat plane). The footprint of each workpiece is substantially identical for the billets shown in FIG. 2, with there being only a very slight overhang 6 at each end where the footprints do not overlap, although in this case the difference is merely as a result of tolerances in the size of the manufactured billets.

Figure 3:
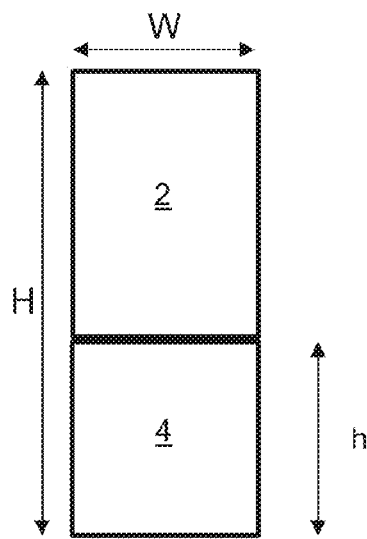
FIG. 3 is an end-on view of the billets of FIG. 2 immediately before welding.
Figure 4:
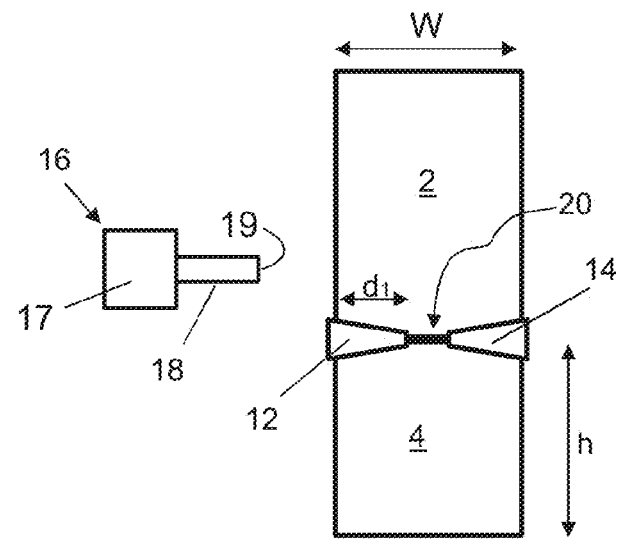
FIG. 4 is an end-on view of the billets of FIG. 2 after they have been friction stir welded together.

Referring to FIGS. 3 and 4, then the two billets 2, 4 are welded together via a first, partial penetration, friction stir weld 12 that is made from the left-hand side of the billets when viewed end-on and a second, partial penetration, friction stir weld 14 that is made from the right-hand side of the billets. The welds are performed by welding in a direction along the length, L, of the workpiece with a friction stir welding (FSW) tool 16, having a shoulder 17, from which extends a FSW pin 18 of about 35 mm in length. In use, the free end 19 of the pin 18 is fully submerged in the material being welded. The welds are positioned at a height h which substantially corresponds to the neutral axis of the spar. FIG. 3 shows the billets in cross-section immediately before the welds are made, and FIG. 4 is the same cross-sectional view, but after the welds 12, 14 have been made. There is substantially no gap between the two billets; it is possible that in reality that the billets 2, 4 are in direct contact across substantially the entire surface, so that there is no perceivable gap at all. It will be seen from FIG. 4 that there is an unwelded central region 20 between the first friction stir weld and the second friction stir weld. The welds extend only partially into the workpieces. For example, the first, partial penetration, friction stir weld 12 extends into the workpieces by a first depth, $d_1$, which is less than half the width W of the workpieces. It will be seen from FIGS. 3 and 5 that the billets 2, 4 are so sized that the height h of the spar which corresponds to the neutral axis 8 of the spar 10 is at or very near to the junction between the two billets.

Figure 5:
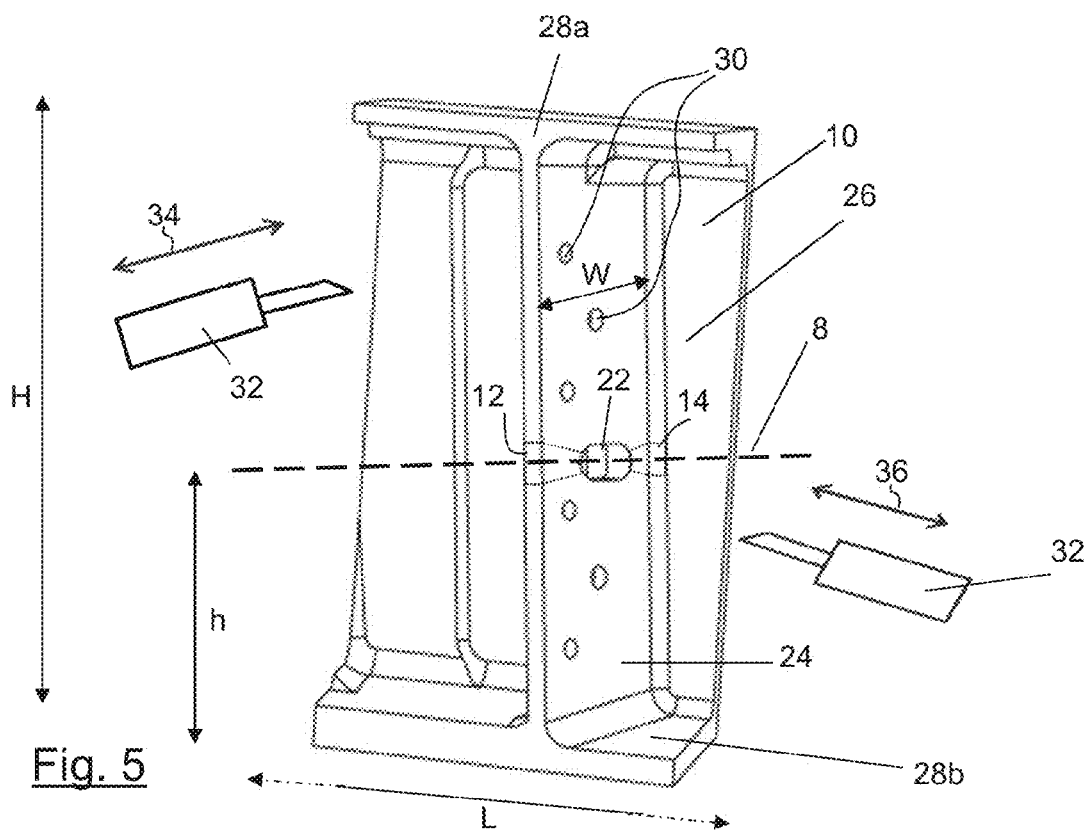
FIG. 5 is a perspective view of a section of an aircraft wing spar that has been machined from the two billets so welded together.
Figure 6:
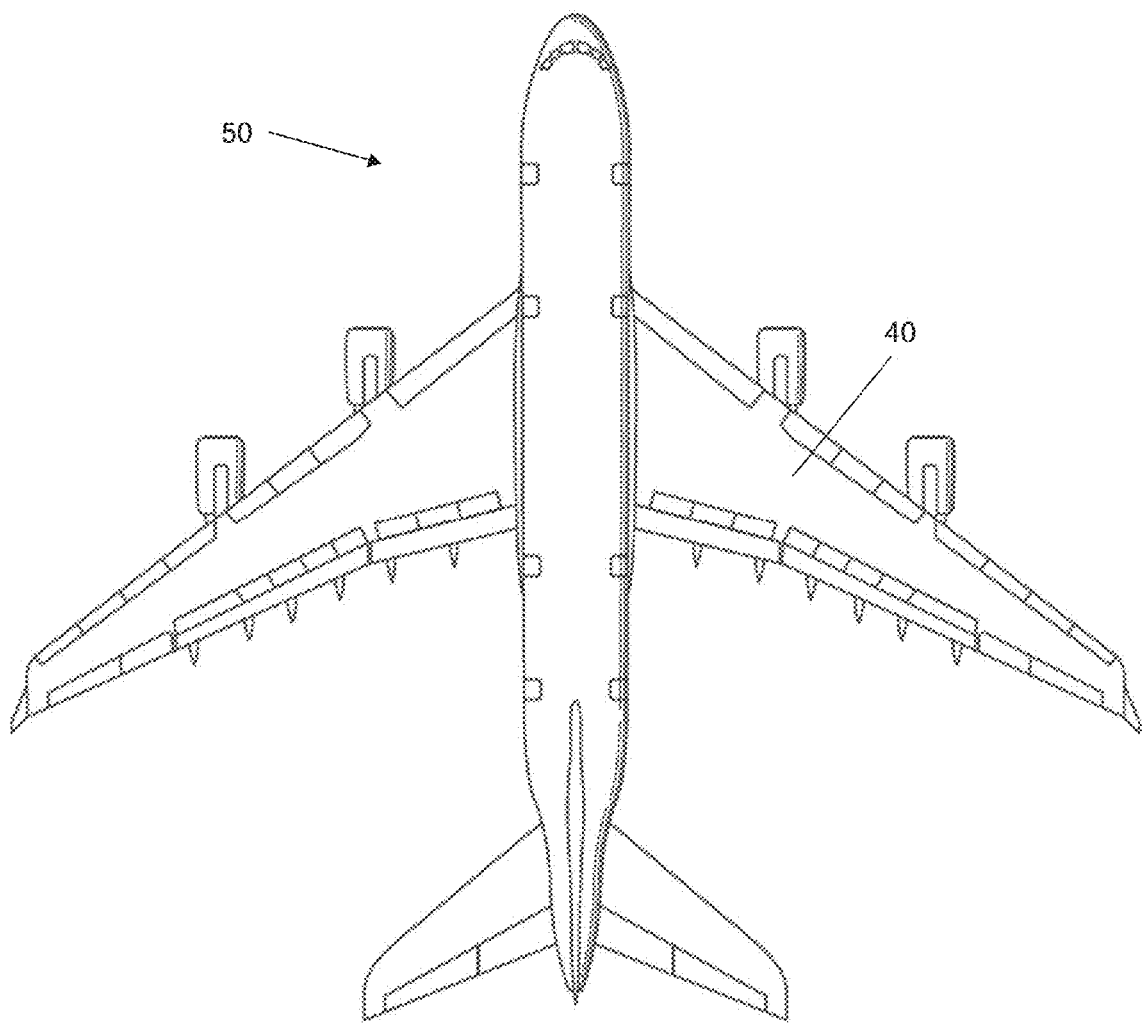
FIG. 6 is a plan view of an aircraft incorporating the wing spar of FIG. 5.

The partially welded together workpieces are then machined to the required shape, like that shown in FIG. 5. The machining away of material converts the partial penetration welds into full penetration welds and/or removes the partial penetration welds. For those cross-sections where both the first and second welds 12, 14 are to be retained as full penetration welds, there is thus formed an opening 22 between the ends of the first and second welds. The opening 22 (or void) is open at opposite ends along the length L of the welded together workpieces. The machining includes milling with a milling tool 32 in a first milling direction 34 generally in the direction of the width W of the spar to remove much of the material of the billets (about 90% by mass) and to form a plate section that eventually forms a stiffener such as the stiffener 24 shown in FIG. 5. The same, or similar, milling tool 32 is subsequently orientated in a second milling direction 36 generally in the direction of the length L of the spar (and therefore transverse to the first milling direction 34) to mill away material so as to form the opening 22.

At regular intervals along the length L of the spar 10 are stiffeners 24 for strengthening the spar 10, one of which being shown in FIG. 5. It will be appreciated that for most of the length of the spar, between successive stiffeners, the machining will remove all of the second weld, resulting in a C-shaped cross-section. As will be seen from FIG. 5, the C-shaped spar section includes a vertical web 26 which is relatively narrow, with an upper flange 28a and a lower flange 28b at opposite ends of the spar web. (It will be appreciated that the web 26 of the spar 10 that extends between the upper and lower flanges 28a, 28b is to be distinguished from the transverse web section that may form a stiffener 24, the stiffener being in a plane that is transverse to the length of the spar). The stiffeners 24 each extend from the upper flange 28a to the lower flange 28b of the spar. The stiffeners 24 appear as plates whose planes are perpendicular to the spar length. The height H of the spar section decreases from one end of the spar section to the other. The width W of the spar 24 is about 100 mm at the section shown in FIG. 5. At intervals along the length of the spar, ribs (not shown) are attached to certain of the stiffeners.

The stiffener 24 shown in FIG. 5 is in the form of a rib post for attaching a rib with bolts, there being six bolt holes 30 machined in. The rib (not shown) connects the illustrated spar section with an adjacent spar section (also not shown) and other components of the wing 40 of an aircraft 50, such as that shown in FIG. 6. A rib will not be attached to every stiffener but will only be attached to, for example, every fourth stiffener. In a common arrangement, the stiffeners to which a rib is attached will have a greater width (like the stiffener in FIG. 5) and the intermediate stiffeners will have a narrower width.

Figure 7:
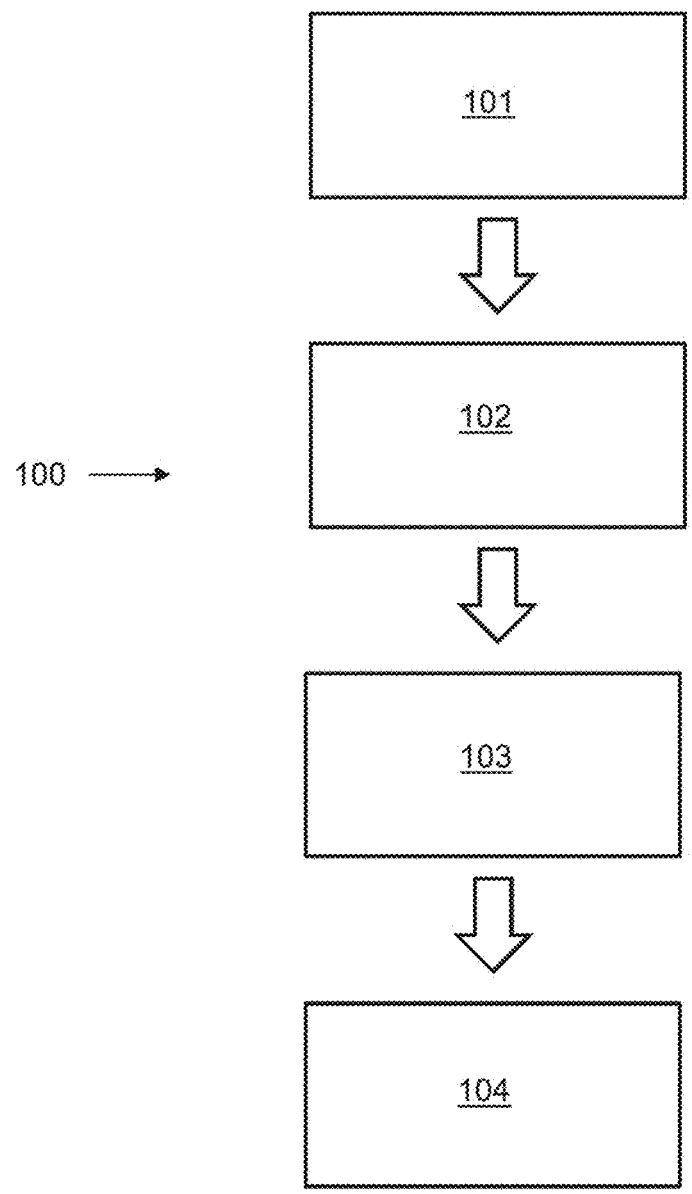
FIG. 7 is a flow diagram illustrating a method according to a second embodiment of the invention.

FIG. 7 shows the steps of a method 100 of making a spar for a wing of an aircraft. Two billets of different alloy are placed in abutting relation, there being no voids or channels formed therebetween (step 1—box 101). Then there is a step of partial penetration friction stir welding together the two billets from opposing sides of the billets, the welds so formed being separated by a central region formed partly by one billet and partly by the other billet (step 2—box 102). Then there is a step of machining away material (step 3—box 103). Step 3 is so performed that no portion having a partial penetration friction stir weld is left, all of the central region is removed, and a bi-alloy spar having at least one transverse web section having a slot formed at least in part by the removal of the central region is formed. The slot is positioned midway between the far ends of the full-penetration friction stir welds that extend to either side of the slot. Various finishing steps (step 4—box 104) may be required in order for the bi-alloy spar so produced to be ready for assembly to form an aircraft wing.

Embodiments of the invention may provide opportunities to design the spar rib posts and stiffeners with weight saving in mind. Embodiments of the invention may provide greater flexibility in how fixing points (e.g. bolt holes) are arranged both above and below the weld line. It may also be possible to weld in a manner that causes less distortion in the work-pieces, which can lead to tighter tolerances in the dimensions of the workpieces pre-welding and possibly therefore lower volumes of waste material. In the case where the slot is appropriately positioned so that the welding stresses are substantially mirrored either side of the weld joint, there may be lower risk of post weld distortion.

Another embodiment of the invention concerns a method of manufacturing a multi-alloy aerospace component, wherein the method comprises the following steps:

forming a multi-alloy assembly by arranging a surface of a first metal alloy workpiece having a first composition adjacent a surface of a second metal alloy workpiece having a second, different, composition, joining the first and second workpieces by friction stir welding at a first side of the multi-alloy assembly, to form a first weld that extends partially into the multi-alloy assembly to a first depth, joining the first and second workpieces by friction stir welding at a second side of the multi-alloy assembly, to form a second weld that extends partially into the multi-alloy assembly to a second depth, wherein the second side is on an opposite side of the multi-alloy assembly to the first side so that the first and second welds extend towards one another, and wherein the deepest extent of the first weld is separated from the deepest extent of the second weld by a central region of material that extends all the way between the deepest extent of the first weld and the deepest extent of the second weld, the central region of material including material of both the first metal alloy workpiece and second metal alloy workpiece, and machining away material from the central region of material to form a void which for example extends from one open end, in a direction along the length of the multi-alloy assembly, to an opposite open end. The machining away of material to form the void advantageously both converts the first weld into a full penetration weld that extends all the way from the first side up to the slot and converts the second weld into a full penetration weld that extends all the way from the second side up to the slot.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The upper and lower billets may have a non-cuboidal shape before they are welded together via the first and second friction stir welds. The billets may be extruded to have such a shape and/or be partially machined in advance of welding. Regions of the billets may be rough machined, then welded, then more accurately machined. There may be some portions of the spar which are welded/formed differently. There may be portions which are joined by one, not two, friction stir welds. Such portions may be made by friction stir welding from opposite sides of the workpieces with the welds meeting in the middle (no slot/void being necessary). Some portions may be formed by welding the workpieces from one side only.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of manufacturing a multi-alloy aerospace component, wherein the method comprises the following steps:

arranging a first metal workpiece against a second metal workpiece, the first metal workpiece being of a first metal alloy and the second metal workpiece being of a second metal alloy, the second metal alloy being different from the first metal alloy;

friction stir welding in a first direction from a first side of the first and second workpieces to form a first weld that extends partially into the workpieces to a first depth and joins partially the first and second workpieces;

friction stir welding in a second direction from a second side of the first and second workpieces to form a second weld that extends partially into the workpieces to a second depth and joins partially the first and second workpieces, the second side being on the opposite side of the workpieces to the first side;

the deepest extent of the first weld being separated from the deepest extent of the second weld by a central region of material that extends all the way between the deepest extent of the first weld and the deepest extent of the second weld, the central region of material including both material of the first metal workpiece and material of the second metal workpiece; and machining away material from the workpieces, the machining including machining away material from the central region of material to form a void being open at opposite ends in a direction parallel to the first direction and to convert the first weld and the second weld either side of the void into full penetration welds.

2. A method according to claim 1, wherein the first metal workpiece and the second workpiece are so shaped before the step of arranging the first metal workpiece against the second workpiece is performed that surfaces of the first metal workpiece and the second workpiece are directly adjacent to each other at all points within the overlapping footprints of the workpieces.

3. A method according to claim 1, wherein before the step of machining away material to form the void is performed, the region that becomes the void has a volume of which more than 95% is filled with either the first metal alloy or the second metal alloy.

4. A method according to claim 1, wherein the step of machining away material includes forming a portion of the multi-alloy aerospace component, which extends between two locations being separated in a direction parallel to the first direction, where the first and second workpieces are welded together only by the first weld.

5. The method according to claim 1, wherein the void is in a form of a slot.

6. A method according to claim 1, wherein the void is formed in a part of the multi-alloy aerospace component that forms a transverse web section.

7. A method according to claim 6, wherein the step of machining away material from the workpieces includes using a milling tool oriented in a third direction to mill away material to form the transverse web section and then subsequently using a milling tool oriented in a fourth direction, transverse to the third direction, to mill away material to form the void in the transverse web section.

8. A method according to claim 1, wherein the void is positioned midway between a first side of the multi-alloy aerospace component and a second side of the multi-alloy aerospace component, the first and second sides of the multi-alloy aerospace component corresponding to the first and second sides, respectively, of the workpieces.

9. A method according to claim 1, wherein the step of machining away material includes machining away more than 75% of a mass of the first and second workpieces.

10. A method according to claim 1, wherein the multi-alloy aerospace component so formed is a spar for an aircraft wing.

11. A method according to claim 10, wherein the void is in a form of a slot formed in a transverse web section of the spar, the transverse web section forming at least part of a stiffener, for example a rib post.

12. A method according to claim 1, wherein the first and second metal alloys are 2xxx or 7xxx series Aluminum alloys.

13. A method of making an aircraft wing spar including:
    placing two billets of different alloy in abutting relation, there being no voids or channels formed therebetween;
    partial penetration friction stir welding together the two billets from opposing sides of the billets, the welds so formed being separated by a central region formed partly by one billet and partly by the other billet, one billet comprising a first alloy and the second billet comprising a second alloy; and
    machining away material so as
        to leave no portion having a partial penetration friction stir weld,
        to remove all of the central region, and
        to form a multi-alloy spar having at least one transverse web section having a slot formed at least in part by the removal of the central region, the slot being positioned midway between far ends of full-penetration friction stir welds that extend to either side of the slot.

14. The method according to claim 13, wherein the aircraft wing spar comprises an upper flange and a lower flange and wherein the transverse web section is in a form of a stiffener which extends from the upper flange of the spar to the lower flange of the spar.

15. A method according to claim 13, wherein the step of machining away material includes using a milling tool to mill away material to form the transverse web section and then using the same milling tool to mill away material to form the slot.

16. A method according to claim 13, wherein the step of machining away material includes machining away more than 75% of a mass of the two billets.

17. A method according to claim 13, wherein the first and second metal alloys are 2xxx or 7xxx series Aluminium Aluminum alloys.

* * * * *